United States Patent [19]
Makabe et al.

[11] Patent Number: 4,467,740
[45] Date of Patent: * Aug. 28, 1984

[54] ELECTRONIC SEWING MACHINE WITH A STITCH PATTERN ADJUSTING DEVICE

[75] Inventors: Hachiro Makabe, Fussa; Kazuo Watanabe, Hachioji; Yoshitaka Takahashi, Koganei, all of Japan

[73] Assignee: Janome Sewing Machine Co., Ltd., Tokyo, Japan

[ * ] Notice: The portion of the term of this patent subsequent to Apr. 14, 1998 has been disclaimed.

[21] Appl. No.: 205,968

[22] Filed: Nov. 12, 1980

Related U.S. Application Data
[63] Continuation of Ser. No. 61,307, Jul. 27, 1979, Pat. No. 4,261,271.

[30] Foreign Application Priority Data
Aug. 11, 1978 [JP] Japan .................................. 53-97337

[51] Int. Cl.³ ............................................. D05B 3/02
[52] U.S. Cl. ................................................ 112/158 E
[58] Field of Search .......... 112/158 E, 121.12, 121.11; 318/567

[56] References Cited
U.S. PATENT DOCUMENTS
4,261,271  4/1981  Makabe et al. ................. 112/158 E Primary Examiner—Peter P. Nerbun
Attorney, Agent, or Firm—Michael J. Striker

[57] ABSTRACT

A sewing machine with an electronic memory stores stitch control signals which are sequentially read out in synchronism with rotation of the upper drive shaft to control at least one of the needle swinging amplitude and the feeding amount or both. Pattern selecting switches are operated to select a pattern of stitches, each stitch being produced by the needle swinging amplitude and feeding amount predetermined by a selected set of stitch control signals of the memory. Manually influenced stitch adjusting means vary either the needle swinging amplitude or feeding amount for fine adjustment of the selected pattern.

2 Claims, 3 Drawing Figures

Fig_1
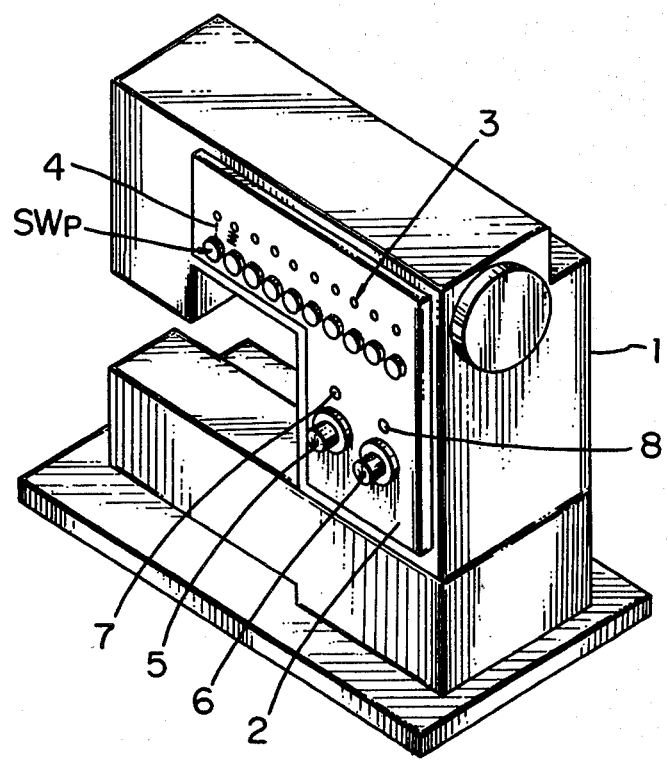
Fig_2
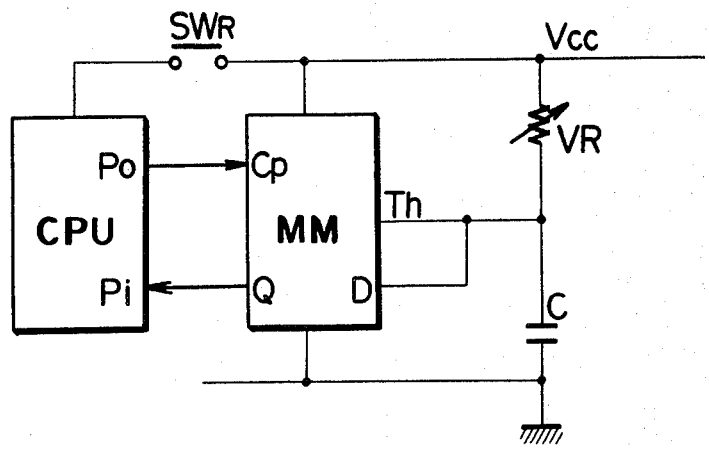

Fig_3
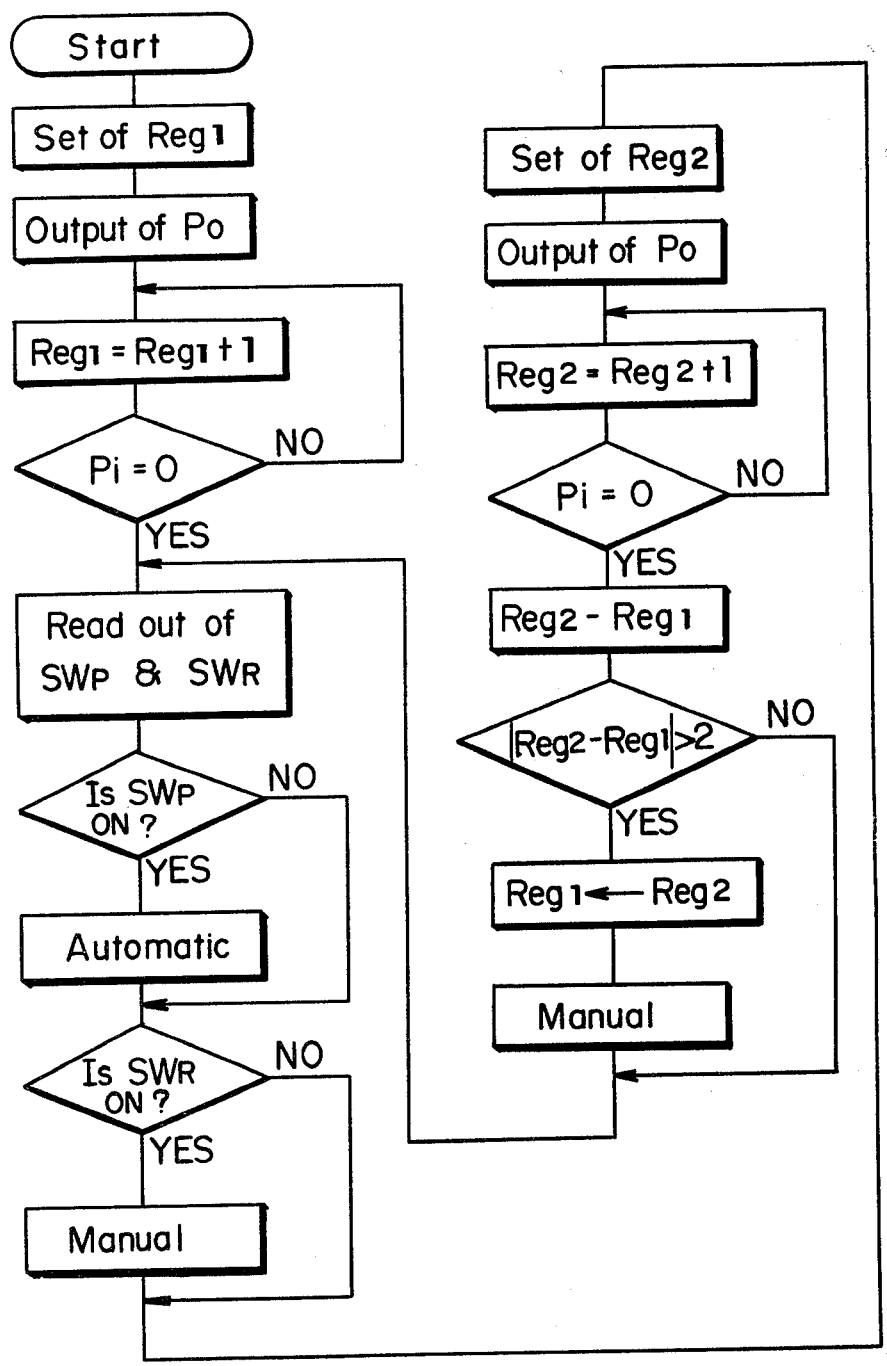

ELECTRONIC SEWING MACHINE WITH A STITCH PATTERN ADJUSTING DEVICE

This is a continuation, of application Ser. No. 061,307, filed July 27, 1979, now U.S. Pat. No. 4,261,271.

BRIEF DESCRIPTION OF THE INVENTION

The present invention relates to an electronic sewing machine, and more particularly relates to a fine adjustment of the stitches of a selected pattern. Namely the needle swinging amplitude or the feeding amount is finely and positively adjusted by a simple manual operation regarding a selected pattern in an electronic sewing machine which has a static momory storing a number of pattern data for controlling the operation of the stitch forming instrumentalities of the sewing machine. According to the invention, if the fine adjustment is desired, a switch is manually operated to make effective a predetermined adjusting value, and if the fine adjustment is not desired, a value is made effective, which value automatically produces a fixed pattern which is selected by operating one of the pattern selecting switches.

With respect to various kinds of stitch patterns in the sewing machine, the proper values are prepared for the needle swinging amplitude and the fabric feed concerning each of the stitches. However it is often required that those values should be variable for a fine adjustment of the patterns in dependence on usages or requirements of the machine operator. Therefore, it is preferable that the needle swinging amplitude and the fabric feeding amount automatically predetermined are provided only by selecting a pattern to be stitched at the proper value particular to such a pattern and that only when the fine adjustment is desired, such adjustment becomes effective to proportionally increase or reduce each of stitches. A structure of mere switch will often cause the machine operator to stitch a pattern of fine adjustment while the automatically set pattern is intended because she happens to forget to return the switch to the initial inoperative position or vice versa. On the other hand, there has been proposed a device which may switch from the automatic pattern stitching to the manual fine adjustment by touching a switch by utilization of the stray potential or the static potential capacity of human body. Such a potential detecting method is quite uncertain because it is influenced by the condition if the machine operator puts on gloves, or by the temperature and humidity in the room. Such a method, therefore, may require some necessary designing considerations for compensation of such adverse conditions.

The present invention has been devised to eliminate such defects and disadvantages of the prior art. It is a primary object of the invention to offer a device of simple and exact operation for fine adjustment of an automatic pattern which may be selected by one of the pattern selecting switches.

The other features and advantages of the invention will be apparent from the following description of the invention in reference to the preferred embodiments as shown in the attached drawings.

BRIEF DESCRIPTION OF THE DRAWINGS

FIG. 1 is an outer appearance of a sewing machine incorporating the device of the invention, FIG. 2 is a control circuit diagram of the above, and FIG. 3 is a flow chart for explaining the data processing operation of the control circuit.

DETAILED DESCRIPTION OF THE INVENTION

The present invention will be explained in regard to the preferred embodiment with reference to the attached drawings. FIG. 1 shows an outer appearance of the sewing machine provided with a device of the invention, in which a reference numeral 1 is a machine housing, 2 is a pattern selecting panel, reference mark $SW_P$ indicates collectively a row of pattern selecting switches, and when any one of them is pushed, this operated part is electronically memorized in a control part (not shown) installed in the sewing machine. The reference numeral 3 collectively shows lightening lamps for indicating the operated parts of the pattern selecting switches. 4 shows collectively a number of stitch pattern indications each provided in correspondence to each of the pattern selecting switches $SW_P$. 5 is a fine adjustment device of a needle swinging amplitude, and 6 is a fine adjustment device of a fabric feed, and these devices can be manually turned into a clockwise direction or into a counterclockwise direction so as to adjust later mentioned variable resistors respectively. On the other hand these devices 5, 6 may be pushed to close the switches respectively which are to be mentioned later. 7 and 8 are indicating lamps which are lighted when these fine adjustment devices are made operative by the rotating or pushing operation thereof.

FIG. 2 is a fine adjustment circuit for controlling the needle swinging amplitude or the fabric feed. The control circuit includes a central processing unit CPT in common, MM is monostable multivibrator, which may be a $\mu$PC 1555C manufactured by Nippon Electric Co., Ltd. The monostable multivibrator has a threshold terminal Th and a discharging terminal D connected to each other. The junction receives an electric voltage of a capacitor C which is charged, via a variable resistor VR, by a D.C positive control power source Vcc as shown. The discharging terminal D is always operative for discharging the capacitor. Cp is a trigger terminal, which receives a pulse signal to make the discharging terminal D inoperative, and at the same time causes the output terminal Q to produce a signal of constant level. When the input of the threshold terminal Th becomes more than a determined level of the monostable multivibrator MM, it stops the signal from the output Q. The variable resistor VR is decreased or increased in its resistance value by rotating, in one direction, the fine adjustment device 5 (or 6) shown in FIG. 1. Thus the variable resistor VR, together with the capacitor C, determines the charging time constant. CPU is a central processing unit of a micro-computer, which is connected to a memory device (not shown) to carry out a later mentioned programming control and a memory control based on the operation of the pattern selecting switch $SW_P$ and produces at the output terminal Po a clock pulse to a trigger terminal Cp of the monostable multivibrator MM. The CPU receives at the input terminal Pi the output signal Q of the monostable multivibrator MM, and digitally counts up the output signal by means of a register (not shown) while the output signal is produced. $SW_R$ is a fine adjustment switch which is closed by pushing the fine adjustment device 5 (or 6) during its pushing period and at this time gives a control voltage Vcc to the central processing unit CPU.

The operation of the above mentioned control circuit will be explained in reference to the flow chart in FIG. 3. When a power source including the control power source Vcc is applied, a programm in FIG. 3 is started. A first resistor Reg 1 in the central processing unit CPU is set to an initial value O. The discharging terminal D of the monostable multivibrator MM is prepared operative and the capacitor C is under a noncharging state. When the clock pulse Po is given to the trigger terminal Cp of the monostable multivibrator MM, the monostable multivibrator MM gives an output at the output terminal Q to the monostable signal input terminal Pi of the CPU. Then the register Reg 1 progressively increases at a fixed period while the output signal is produced. At the same time, the discharging terminal D is nullified, and the capacitor C starts charging via the resistor VR. The charging velocity is determined by the rotating position of the fine adjustment device 5 (or 6). When the potential of the capacitor C, i.e., the potential of the threshold terminal Th reaches the determined value, the output Q is stopped and the input Pi becomes O. In the meantime, the register Reg 1 progressively increases the stops. Subsequently the central processing unit CPU reads out and memorizes the operated conditions of the pattern selecting switch $SW_P$ and the fine adjustment switch $SW_R$. As a result, when any one of the pattern selecting switches $SW_P$ is operated, the needle swinging amplitude and the fabric feed are automatically set to form a standard stitch pattern, and a selected pattern is indicated by the lamp 3. If the device 5 or 6 is pushed and it is detected that the fine adjustment switch $SW_R$ is closed, the automatic control is switched to that manual control for fine adjustment of a pattern, and the lamp 7 indicates it. In this case the fine adjustment device 5 or 6 was immediately pushed because the device had been rotated to a desired position. The stitches of the pattern may be reduced or enlarged in proportion to the position to which the device 5 or 6 is rotated. While the fine adjustment switch $SW_R$ is not operated, or after the order of switching to the manual operation is issued, a second resister Reg 2 in the central processing unit CPU is set to the initial value O. The monostable multivibrator MM again gives the output to the input terminal Pi of the CPU and the second resistor Reg 2 progressively increases and stops just in the same manner as the first resistor Reg 1. At this time, if the fine adjustment device 5 is rotated in the clockwise or counterclockwise direction, the charging time of the capacitor C is differentiated from the previous one, and the resistors Reg 1 and Reg 2 are differentiated in the values from each other. Difference between the values of the resistor Reg 1 and the resistor Reg 2 is calculated. If this difference is more than a predetermined value such as 2, for example, the value of the register Reg 2 is transferred into the first resistor Reg 1. Then the manual operation is made effective and the indicating lamp 7 indicates it. When the fine adjustment switch $SW_R$ is not operated, or when there is a slight variance in the contact resistor, the difference between the values of the registers Reg 1, Reg 2 is less than 2. Therefore, the value of the first resistor Reg 1 is not transferred as said above in reference to FIG. 3, and the previously ordered manual or automatic control is available. If these processes are finished, the switches $SW_P$ and $SW_R$ are read out and thus the loop is completed. If the operation is not changed, the first resistor Reg 1 is not exchanged, and the reading-out, the calculation and the memorization are carried out at the high speed by said loop even if there is a time lag in the operations of the switches $SW_P$, $SW_R$ and the variable resistor VR, and it is possible to form stitches of the desired automatically or manually set value. If the stitching is started, though not shown, each of the processes of FIG. 3 is stopped.

According to the present invention, when the pattern selecting switch is only operated, the predetermined stitch by the standard needle swinging amplitude and the fabric feed is formed, irrespectively of conditions before the selection of the pattern. When the controlling position of the fine adjustment device is only changed the manual set value is available at this position, and when the fine adjustment device had been already positioned at the desired value the manual set value is available at this position only by the pushing operation.

We claim:

1. A sewing machine having an electronic memory storing stitch control signals which are sequentially read out in synchronism with rotation of the upper drive shaft of the sewing machine to control at least one of the needle swinging amplitude and the feeding amount, thereby to form a pattern of stitches, a number of pattern selecting switches each selectively operated to select a pattern of stitches, each stitch being produced by a predetermined needle swinging amplitude and a predetermined feeding amount, comprising stitch adjusting means manually operated to vary at least one of the needle swinging amplitude and the feeding amount per each stitch of the selected pattern, a switch which is closed by one mode of operation of the stitch adjusting means, a capacitor charging circuit including a capacitor and a variable resistor, the value of said variable resistor being determined by another mode of operation of the stitch adjusting means, thereby to determine the time constant of the circuit, a monostable multivibrator producing a signal in a time based on the charging time of the capacitor charging circuit, and a microcomputer including a central processing unit detecting and memorizing the manual operations of the specific pattern selecting switches and the stitch adjusting means, and digitally counting and calculating the signals from the monostable multivibrator, thereby to make the stitch adjusting means effective or ineffective.

2. A sewing machine as defined in claim 1, wherein the stitch adjusting means is manually rotated to variably determine the value of the variable resistor, and is pushed to close the switch (SWR), thereby to give a control current to the central processing unit.

* * * * *